US012365953B2

(12) United States Patent
Kawashiri et al.

(10) Patent No.: US 12,365,953 B2
(45) Date of Patent: Jul. 22, 2025

(54) METHOD OF OPERATING BLAST FURNACE AND BLAST FURNACE ANCILLARY FACILITY

(71) Applicant: JFE STEEL CORPORATION, Tokyo (JP)

(72) Inventors: Yuki Kawashiri, Tokyo (JP); Sumito Ozawa, Tokyo (JP); Koichi Takahashi, Tokyo (JP); Taihei Nouchi, Tokyo (JP); Yuya Morita, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 557 days.

(21) Appl. No.: 17/757,828

(22) PCT Filed: Dec. 14, 2020

(86) PCT No.: PCT/JP2020/046607
§ 371 (c)(1),
(2) Date: Jun. 22, 2022

(87) PCT Pub. No.: WO2021/131866
PCT Pub. Date: Jul. 1, 2021

(65) Prior Publication Data
US 2023/0034442 A1 Feb. 2, 2023

(30) Foreign Application Priority Data
Dec. 26, 2019 (JP) .................................. 2019-236280

(51) Int. Cl.
*C21B 5/00* (2006.01)
*F27D 17/00* (2025.01)
*F27D 17/10* (2025.01)

(52) U.S. Cl.
CPC .............. *C21B 5/001* (2013.01); *F27D 17/10* (2025.01); *C21B 2005/005* (2013.01); *C21B 2100/62* (2017.05); *C21B 2100/64* (2017.05)

(58) Field of Classification Search
CPC .............. C21B 5/001; C21B 2005/005; C21B 2100/62; C21B 2100/22; C21B 2100/282;
(Continued)

(56) References Cited

U.S. PATENT DOCUMENTS 3,458,307 A * 7/1969 Marshall et al. ......... C21B 5/06
266/139
6,045,602 A * 4/2000 Shah ...................... F25J 3/0252
75/505

(Continued)

FOREIGN PATENT DOCUMENTS

| CN | 102782161 A | 11/2012 |
|----|-------------|---------|
| CN | 104412056 A | 3/2015 |

(Continued)

OTHER PUBLICATIONS

JP-2016222949, Nouchi et al., Method For Operation Oxygen Blast Furnace, Dec. 28, 2016 (Year: 2016).*
(Continued)

*Primary Examiner* — Jessee R Roe
*Assistant Examiner* — Michael Aboagye
(74) *Attorney, Agent, or Firm* — KENJA IP LAW PC (57) ABSTRACT

Provided is a method of operating a blast furnace, including generating a regenerative methane gas using a blast furnace by-product gas, and blowing a blast gas and a reducing agent into the blast furnace from a tuyere, in which the blast gas is oxygen gas, the regenerative methane gas is used as at least part of the reducing agent, and the oxygen gas and/or the regenerative methane gas is preheated before being blown into the blast furnace from the tuyere.

10 Claims, 6 Drawing Sheets

(58) Field of Classification Search
CPC ... C21B 5/06; C21B 2100/64; C21B 2100/26; C21B 2100/284; C21B 2100/44; F27D 17/10; F27D 17/004; Y02P 10/143; Y02P 10/122; F27B 1/26; F27B 1/28
USPC .......... 266/47, 186, 218, 224, 225, 265, 152
See application file for complete search history.

(56) References Cited

U.S. PATENT DOCUMENTS

| | | |
|---|---|---|
| 10,106,863 B2 | 10/2018 | Inada et al. |
| 2015/0068364 A1 | 3/2015 | Garza-Davila et al. |
| 2016/0153316 A1 | 6/2016 | Bergins et al. |
| 2016/0326604 A1 | 11/2016 | Takanobu et al. |

FOREIGN PATENT DOCUMENTS

| | | | | |
|---|---|---|---|---|
| CN | 105899686 A | | 8/2016 | |
| CN | 106103746 A | | 11/2016 | |
| DE | 102016008915 A1 | | 1/2018 | |
| EP | 2543743 A1 | * | 1/2013 | ......... C21B 2100/22 |
| EP | 3124626 A1 | | 2/2017 | |
| EP | 2543743 B1 | | 11/2017 | |
| EP | 2653564 B1 | | 9/2018 | |
| JP | S63171804 A | | 7/1988 | |
| JP | 2003261301 A | | 9/2003 | |
| JP | 2011225969 A | | 11/2011 | |
| JP | 2014005510 A | | 1/2014 | |
| JP | 2015129325 A | | 7/2015 | |
| JP | 5796672 B2 | | 10/2015 | |
| JP | 2016222949 A | * | 12/2016 | ............ C21B 5/001 |
| KR | 1020070083479 A | | 8/2007 | |
| KR | 1020160030559 A | | 3/2016 | |
| SU | 1245588 A1 | | 7/1986 | |
| SU | 1266864 A1 | | 10/1986 | |
| TW | 201231679 A1 | | 8/2012 | |

OTHER PUBLICATIONS

Apr. 5, 2023, Office Action issued by the Canadian Intellectual Property Office in the corresponding Canadian Patent Application No. 3,158,066.

Feb. 2, 2023, Office Action issued by the China National Intellectual Property Administration in the corresponding Chinese Patent Application No. 202080086980.5 with English language search report.

Jun. 6, 2023, the Extended European Search Report issued by the European Patent Office in the corresponding European Patent Application No. 20904421.3.

Jan. 25, 2024, Office Action issued by the Korean Intellectual Property Office in the corresponding Korean Patent Application No. 10-2022-7018719 with English language concise statement of relevance.

Mar. 10, 2023, Office Action issued by the Federal Service for Intellectual Property, Patents and Trademarks of the Russian Federation in the corresponding Russian Patent Application No. 2022118941 with English language search report.

Apr. 12, 2022, Notification of Reasons for Refusal issued by the Japan Patent Office in the corresponding Japanese Patent Application No. 2021-512959 with English language Concise Statement of Relevance.

Aug. 19, 2021, Office Action issued by the Taiwan Intellectual Property Office in the corresponding Taiwanese Patent Application No. 109145643 with English language Concise Statement of Relevance.

Dec. 14, 2021, Notification of Reasons for Refusal issued by the Japan Patent Office in the corresponding Japanese Patent Application No. 2021-512959 with English language Concise Statement of Relevance.

Feb. 2, 2021, International Search Report issued in the International Patent Application No. PCT/JP2020/046607.

* cited by examiner

METHOD OF OPERATING BLAST FURNACE AND BLAST FURNACE ANCILLARY FACILITY

TECHNICAL FIELD

The present disclosure relates to a method of operating a blast furnace and a blast furnace ancillary facility.

BACKGROUND

In recent years, there has been a strong need to reduce carbon dioxide ($CO_2$) emissions against the backdrop of global environmental issues. Therefore, operation with a low reducing agent rate (low RAR) is required in operating a blast furnace installed in a steelworks.

In a typical blast furnace, hot blast (air heated to about 1200° C.) is blown into the blast furnace as a blast gas from a tuyere. As a result, oxygen in the hot blast reacts with coke or pulverized coal as a reducing agent to produce carbon monoxide (CO) and hydrogen ($H_2$) gases. These carbon monoxide and hydrogen gases reduce iron ore charged into the blast furnace. In addition, carbon dioxide is produced during the reduction reaction of the iron ore.

The blast gas is a gas that is blown into the blast furnace from the tuyere. The blast gas also plays a role in gasifying the pulverized coal and coke in the blast furnace.

As a technique to reduce carbon dioxide emissions in blast furnace operations, a technique has been proposed to reform the carbon monoxide and carbon dioxide contained in the by-product gas emitted from the blast furnace, etc., to produce hydrocarbons such as methane and ethanol, and to introduce the produced hydrocarbons back into the blast furnace as a reducing agent.

For example, JP2011-225969A (PTL 1) describes:
"a method of operating a blast furnace comprising a step (A) of separating and recovering $CO_2$ and/or CO from a mixed gas containing $CO_2$ and/or CO, a step (B) of adding hydrogen to the $CO_2$ and/or CO separated and recovered in the step (A) and converting the $CO_2$ and/or CO into CH4, a step (C) of separating and removing $H_2O$ from the gas that has undergone the step (B), and a step (D) of blowing the gas that has undergone the step (C) into the blast furnace".
JP2014-005510A (PTL 2) describes:
"a method of operating a blast furnace comprising separating $CO_2$ from an exhaust gas of a combustion furnace that uses a blast furnace by-product gas as the whole or part of fuel, reforming the separated $CO_2$ into methane to obtain a reducing gas, and blowing the reducing gas into the blast furnace".

CITATION LIST

Patent Literature

PTL 1: JP 2011-225969A
PTL 2: JP 2014-005510A

SUMMARY

Technical Problem

However, with the techniques of PTLs 1 and 2, when the amount of methane blown into the blast furnace as the reducing agent exceeds a certain level, it may cause operational problems such as insufficient heating of the bottom of the blast furnace, pressure drop increase, and tapping failure.

Therefore, there is a need to develop a method of operating a blast furnace that can further reduce carbon dioxide emissions from the blast furnace under stable operation.

In view of the current situation described above, it could be helpful to provide a method of operating a blast furnace that can further reduce carbon dioxide emissions from the blast furnace under stable operation.

It could also be helpful to provide a blast furnace ancillary facility for use in the method of operating a blast furnace described above.

Solution to Problem

We conducted intensive studies to achieve the objects stated above.

First, we examined the cause of the operational problems occurring when the amount of methane blown into the blast furnace as a reducing agent exceeds a certain level in the techniques of PTLs 1 and 2.

As a result, we have made the following discoveries.

When the amount of methane blown into the blast furnace as a reducing agent exceeds a certain level, the temperature of flame (hereinafter referred to as tuyere-outlet temperature) generated by the combustion of the blown reducing agent and coke in the combustion area (raceway) near the outlet of the tuyere decreases significantly. The decrease in the tuyere-outlet temperature becomes the cause of the operational problems such as insufficient heating of the bottom of the blast furnace, pressure drop increase, and tapping failure.

In detail, when pulverized coal is blown into the blast furnace from the tuyere as a reducing agent, because the main component of the pulverized coal is carbon, the following reaction occurs in the raceway:

$$C+0.5O_2=CO+110.5 \text{ kJ/mol}.$$

On the other hand, when methane is blown as a reducing agent into the blast furnace from the tuyere, the following reaction occurs in the raceway:

$$CH_4+0.5O_2=CO+2H_2+35.7 \text{ kJ/mol}.$$

The amount of heat generated during the reaction, when converted to one mole of the total amount of CO and $H_2$, is 11.9 kJ/mol.

For stable operation of the blast furnace, it is necessary to control the tuyere-outlet temperature in the range of 2000° C. to 2400° C. However, if most of the reducing agent blown into the blast furnace is changed to methane gas from pulverized coal, the tuyere-outlet temperature will decrease due to the difference in reaction heat described above. As a result, the tuyere-outlet temperature cannot be controlled within the above range, and the various operational problems occur.

Based on the above discoveries, we made further investigations.

As a result, we have made following discoveries. Using oxygen gas instead of hot blast (air heated to about 1200° C.) as the blast gas effectively prevented the decrease in the tuyere-outlet temperature even when a large amount of methane is used as the reducing agent to be blown into the blast furnace. Further, by regenerating such methane from a by-product gas discharged from the blast furnace (hereinafter also referred to as blast furnace by-product gas) and blowing the regenerated methane (regenerative methane gas) back into the blast furnace as a reducing agent, stable blast furnace operation can be achieved while further reducing carbon dioxide emissions from the blast furnace.

In addition, the amount of nitrogen contained in the blast furnace by-product gas is greatly reduced by using oxygen gas with a particularly high oxygen concentration as the blast gas. As a result, the process of separating carbon monoxide and carbon dioxide from the blast furnace by-product gas is no longer necessary, which is extremely advantageous in terms of facility compactness.

We believe that the reason why the tuyere-outlet temperature can be controlled in the range of 2000° C. to 2400° C. by using oxygen gas as the blast gas even when a large amount of methane is used as the reducing agent blown into the blast furnace is as follows.

In detail, when hot blast (air heated to about 1200° C.) is used as the blast gas, the combustion gas contains nitrogen of about 50% by volume, which does not contribute to the combustion reaction, and thus the flame temperature in the raceway is hardly to be high. Therefore, when most of the reducing agent blown into the blast furnace is changed to methane gas from pulverized coal, the difference between the reaction heat in the pulverized coal-oxygen reaction and the reaction heat in the methane gas-oxygen reaction described above will cause the tuyere-outlet temperature to drop, and eventually the tuyere-outlet temperature will fall below 2000° C., which is the lower limit of the appropriate temperature.

On the other hand, the use of oxygen gas as the blast gas can suppress the mixing of nitrogen gas, which does not contribute to the combustion reaction, so that the tuyere-outlet temperature can be raised to a sufficient temperature. In detail, the flame temperature in the raceway can be made higher than when hot blast is used, so that even when a large amount of methane is blown in as a reducing agent from the tuyere, the tuyere-outlet temperature can be controlled in the range of 2000° C. to 2400° C., which is the appropriate range.

We also made further studies and found that preheating the oxygen gas and/or regenerative methane gas before blowing it into the blast furnace from the tuyere can further reduce carbon dioxide emissions from the blast furnace.

Here, we believe that the reason why preheating the oxygen gas and/or regenerative methane gas before blowing it into the blast furnace from the tuyere can further reduce carbon dioxide emissions from the blast furnace is as follows.

In detail, we believe that the amount of heat required for blast furnace operation, which is originally supplied as reaction heat in gasifying carbon with oxygen, can be covered with sensible heat of the blast gas obtained by preheating the oxygen gas and/or regenerative methane gas, thereby reducing the amount of carbon gasification, and thus carbon dioxide emissions.

The present disclosure is based on these discoveries and further studies.

Primary features of the present disclosure are as follows.

1. A method of operating a blast furnace, comprising
   generating a regenerative methane gas using a blast furnace by-product gas which is a by-product gas discharged from the blast furnace, and
   blowing a blast gas and a reducing agent into the blast furnace from a tuyere,
   wherein the blast gas is oxygen gas, the regenerative methane gas is used as at least part of the reducing agent, and the oxygen gas and/or the regenerative methane gas is preheated before being blown into the blast furnace from the tuyere.

2. The method of operating a blast furnace according to 1., wherein a consumption rate of circulating carbon atoms in the reducing agent is 60 kg/t or more,
   wherein the consumption rate of circulating carbon atoms is a carbon equivalent mass of the regenerative methane gas that is blown into the blast furnace as the reducing agent for producing 1 t of hot metal, and is obtained by the following equation:

[Consumption rate of circulating carbon atoms (kg/t)]=[Mass of methane in regenerative methane gas blown into blast furnace as reducing agent (kg)]×(12/16)÷[Production amount of hot metal (t)].

3. The method of operating a blast furnace according to 1. or 2., wherein the oxygen gas has an oxygen concentration of 80% or more by volume.

4. The method of operating a blast furnace according to any one of 1. to 3., wherein the regenerative methane gas is generated from part of the blast furnace by-product gas and a surplus of the blast furnace by-product gas is supplied to a steelworks.

5. The method of operating a blast furnace according to any one of 1. to 4., wherein a surplus of the regenerative methane gas is supplied to the steelworks.

6. A blast furnace ancillary facility used in the method of operating a blast furnace according to any one of 1. to 5., comprising
   a methane gas generation device that generates the regenerative methane gas using the blast furnace by-product gas,
   a preheating device that preheats the oxygen gas and/or the regenerative methane gas, and
   a gas blowing device having a methane gas supply section that introduces the regenerative methane gas into the tuyere of the blast furnace and an oxygen gas supply section that introduces the oxygen gas into the tuyere of the blast furnace.

Advantageous Effect

The present disclosure enables further reduction of carbon dioxide ($CO_2$) emissions from the blast furnace to the outside under stable operation. The use of the methane gas generated from the blast furnace by-product gas can also reduce the amount of coke and pulverized coal used, that is, the amount of coal as a finite fossil fuel used.

In addition, since the amount of nitrogen in the blast furnace by-product gas is greatly reduced, the process of separating carbon monoxide and carbon dioxide from the blast furnace by-product gas, or in other words, the huge pressure swing adsorption (PSA) separator or the like is not necessary, which is extremely advantageous in terms of making the facility more compact.

DETAILED DESCRIPTION

The presently disclosed techniques will be described below by way of embodiments.

One of the disclosed embodiments is a method of operating a blast furnace, comprising generating a regenerative methane gas using a blast furnace by-product gas which is a by-product gas discharged from the blast furnace, and blowing a blast gas and a reducing agent into the blast furnace from a tuyere, wherein the blast gas is oxygen gas, the regenerative methane gas is used as at least part of the reducing agent, and the oxygen gas and/or the regenerative methane gas (that is, either or both of the oxygen gas and the regenerative methane gas) is preheated before being blown into the blast furnace from the tuyere.

First, the method of operating a blast furnace according to one of the disclosed embodiments will be described, taking as an example the case where the method is applied to the blast furnace and blast furnace ancillary facility schematically illustrated in FIG. 1.

In the figure, reference sign 1 is a blast furnace, 2 is a tuyere, 3 is a methane gas generation device, 3-2 and 3-3 are preheating devices, 4 is a gas blowing device, 5 is a first dehydration device, 6 is a second dehydration device, and 7 is a burner.

As used herein, the term "blast furnace" includes shaft-type reducing furnaces.

[How to Operate a Blast Furnace]

In the method of operating a blast furnace according to one of the disclosed embodiments, sinter, lump ore, and pellet (hereinafter also referred to as ore material), coke, etc., which are raw materials, are charged into the blast furnace from the head of the furnace (not illustrated). In addition, the blast gas and reducing agent are blown into the blast furnace 1 from the tuyere 2 provided at the bottom of the blast furnace. The reducing agent that is blown into the blast furnace 1 from the tuyere 2 is also called "blown reducing agent" to distinguish it from coke.

The carbon monoxide gas and hydrogen gas produced by the reaction between the blast gas and the reducing agent reduce the ore material charged into the blast furnace 1. In the reduction reaction of the ore material, carbon dioxide is generated. The carbon dioxide is then discharged from the head of the blast furnace as a by-product gas, along with carbon monoxide and hydrogen that have not reacted with the ore material. The head of the blast furnace is under high pressure conditions of about 2.5 atm. Therefore, water vapor condenses due to the expansion and cooling of the blast furnace by-product gas which is the by-product gas discharged from the head of the blast furnace as it returns to normal pressure. The condensate is then removed through the first dehydration device 5.

Then, at least part of the blast furnace by-product gas is introduced into the methane gas generation device 3. Then, in the methane gas generation device 3, carbon monoxide and carbon dioxide contained in the blast furnace by-product gas are reacted with hydrogen gas to produce methane ($CH_4$) gas. Here, the methane gas obtained by reacting the blast furnace by-product gas is referred to as regenerative methane gas.

The hydrogen gas used to produce the regenerative methane gas can be supplied from within the steelworks or from outside. When the hydrogen gas is produced in the steelworks, a method that produces as little carbon dioxide as possible is preferable, for example, electrolysis of water can be used. In addition, the hydrogen gas to be supplied from outside includes, for example, hydrogen gas produced by reforming hydrocarbons such as natural gas by steam reforming, etc., hydrogen gas obtained by vaporizing liquefied hydrogen, and hydrogen gas produced by dehydrogenating organic hydrides.

The hydrogen gas used in the production of the regenerative methane gas does not have to be a gas with a hydrogen concentration of 100% by volume, but to achieve a high concentration of methane in the regenerative methane gas, a gas with a high hydrogen concentration, specifically, a hydrogen gas with a hydrogen concentration of 80% or more by volume is preferably used. The hydrogen concentration is more preferably 90% or more by volume, and further preferably 95% or more by volume. The hydrogen concentration may be 100% by volume. The remainder gas other than hydrogen includes, for example, CO, $CO_2$, $H_2S$, $CH_4$, and $N_2$.

Then, by cooling the regenerative methane gas to room temperature, the water vapor in the regenerative methane gas is condensed. Then, in the second dehydration device 6, the condensate is removed.

The regenerative methane gas from which the condensate has been removed and/or the oxygen gas to be used as the blown gas as described below are then preheated in the preheating devices 3-2 and/or 3-3.

This is because the amount of heat required for blast furnace operation, which is originally supplied as reaction heat in gasifying carbon with oxygen, can be covered with sensible heat of the blast gas obtained by preheating the oxygen gas and/or regenerative methane gas, thereby reducing the amount of carbon gasification, and thus carbon dioxide emissions.

The preheating of the regenerative methane gas and oxygen gas may be performed for only one of them, but it is preferable to perform it for both.

When a reducing agent other than the regenerative methane gas is used as the blown reducing agent, it is also preferable to preheat the reducing agent other than the regenerative methane gas (especially, the external methane gas described below) at the same time.

The preheating temperature (supply temperature) of the regenerative methane gas is preferably in the range of 200° C. to 450° C. When the blown reducing agent other than the regenerative methane gas is used at the same time, the preheating temperature (supply temperature) of the blown reducing agent other than the regenerative methane gas is preferably in the range of 100° C. to 600° C. In particular, when the blown reducing agent other than the regenerative methane gas is external methane gas, the preheating temperature (supply temperature) of the external methane gas is preferably in the range of 200° C. to 450° C.

(In detail, when the regenerative methane gas and external methane gas are used as the blown reducing agent, the preheating temperature (supply temperature) of the blown reducing agents is preferably in the range of 200° C. to 450° C.).

The preheating temperature (supply temperature) of the oxygen gas is preferably in the range of 300° C. to 800° C.

Preheating may be performed by electric heating or heat exchange using high-temperature gas as a medium.

No limitation is placed on the electric power used in the electric heating, but it is preferable to use electric power derived from renewable energy sources or generated by a power generation facility in the steelworks.

When using electric power derived from renewable energy sources, it is possible to further reduce carbon dioxide emissions. The renewable energy refers to energy that exists regularly in nature, such as solar, wind, hydro, geothermal, and biomass. When using electric power generated by a power generation facility in the steelworks, it is possible to construct a more efficient resource recycling system. The power generation facility in the steelworks includes, for example, a head pressure power generation facility of the blast furnace and a power generation facility that use the blast furnace by-product gas as fuel (heat source). In the power generation facility that uses the blast furnace by-product gas as fuel (heat source), coke oven gas (by-product gas discharged from a coke oven), converter gas (by-product gas discharged from a converter), or city gas can be also used as fuel according to the operating conditions of the blast furnace.

The medium of heat exchange (hereinafter referred to as "heat medium") can be a blast furnace by-product gas, heat generated from the regenerative methane gas (waste heat from the methane gas generation device), or heat generated from hydrogen produced by the water electrolysis.

Then, the regenerative methane gas is introduced into the gas blowing device 4. The gas blowing device 4 is connected to the methane gas generation device 3 via the second dehydration device 6. The gas blowing device 4 has a methane gas supply section that introduces the regenerative methane gas, which serves as the blown reducing agent, into the tuyere 2 of the blast furnace 1, and an oxygen gas supply section that introduces oxygen gas, which serves as the blast gas, into the tuyere of the blast furnace.

Figure 2A:
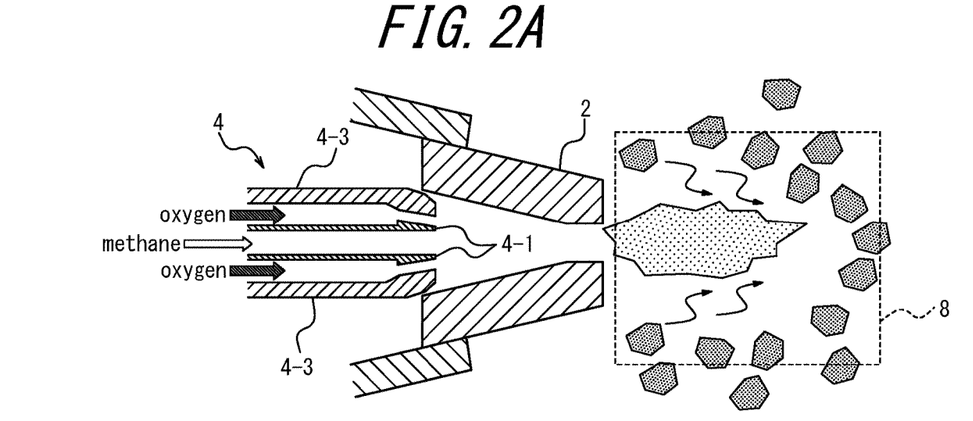
FIGS. 2A and 2B each schematically illustrate an example of a gas blowing device used in the method of operating a blast furnace according to one of the disclosed embodiments.

For example, as illustrated in FIG. 2A, the gas blowing device 4 comprises coaxial multiple pipes including a central pipe 4-1 and an outer pipe 4-3. Then, the methane gas (regenerative methane gas and appropriately, external methane gas as described below) is introduced into the inner passage of the central pipe, which serves as the methane gas supply section (passage), and the oxygen gas is introduced into the annular pipe passage between the central pipe 4-1 and the outer pipe 4-3, which serves as the oxygen gas supply section (passage).

Another blown reducing agent, for example, pulverized coal, waste plastics, or reducing gas such as hydrogen gas or carbon monoxide gas, may be used together. The total blowing amount of the another blown reducing agent into the blast furnace is preferably 150 kg/t or less. Here, the unit of "kg/t" is the amount of the another blown reducing agent blown into the blast furnace in producing 1 t of hot metal.

Figure 2B:
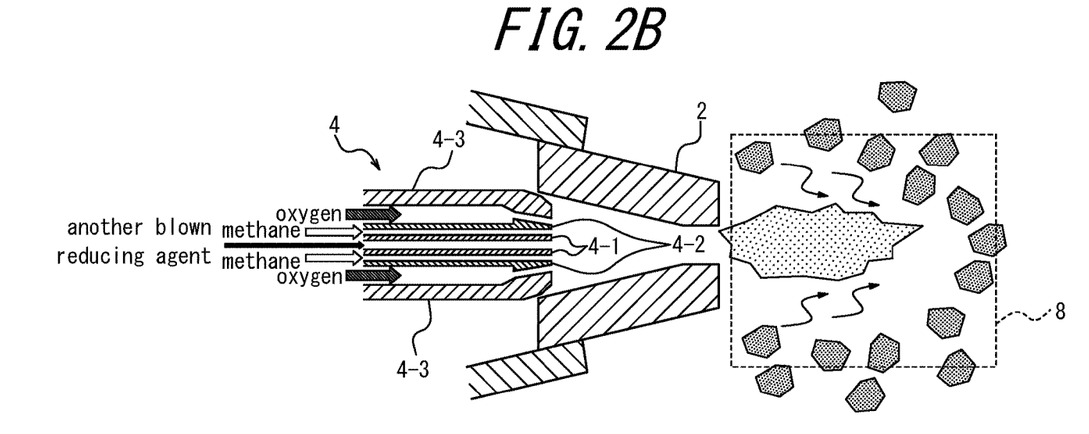

When the another blown reducing agent is used, it may also be introduced into the methane gas supply section. When using pulverized coal or waste plastics as the another blown reducing agent, it is preferable to provide, separately from the methane gas supply section, another reducing agent supply section (passage) through which the pulverized coal or waste plastics flow. In this case, as illustrated in FIG. 2B, for example, the gas blowing device 3 comprises coaxial multiple pipes including, in addition to the central pipe 4-1 and outer pipe 4-3, an inner pipe 4-2 provided between the central pipe 4-1 and outer pipe 4-3. Then, the another blown reducing agent such as pulverized coal or waste plastics is introduced from the inner passage of the central pipe, which serves as the another reducing agent supply section. Further, methane gas is introduced from the annular pipe passage between the central pipe 4-1 and the outer pipe 4-3, which is the methane gas supply section, and oxygen is introduced from the annular pipe passage between the inner pipe 4-2 and the outer pipe 4-3, which is the oxygen gas supply section.

Since the use of oxygen gas as the blast gas causes poor ignitability, compared with the use of hot blast, it is preferable to provide the discharge section of the outer pipe that constitutes the oxygen gas supply section of the gas blowing device 4 with a porous structure to promote the mixing of the oxygen gas and the blown reducing agent.

It is not necessary to use the regenerative methane gas for the whole of the methane gas blown into the blast furnace from the tuyere (hereinafter referred to as "blown methane gas"), but a methane gas supplied from a separate line (also referred to as "external methane gas") may be used in accordance with the operation of the steelworks. In this case, a supply line of the external methane gas may be connected to the methane gas supply section of the gas blowing device 4, or to the another reducing agent supply section as described above. The external methane gas supply line may also be connected to the regenerative methane gas flow passage between the methane gas generation device 3 and the gas blowing device 4 (preferably between the second dehydration device 6 and the gas blowing device 4). A preheating device for external methane gas may be separately installed in the external methane gas supply line. In particular, as illustrated in FIG. 1, the external methane gas supply line is preferably connected upstream of the preheating device 3-2 (between the second dehydration device 6 and the preheating unit 3-2) so that the regenerative methane gas and external methane gas are both preheated in the preheating device 3-2.

The external methane gas includes, for example, a methane gas derived from fossil fuels.

Then, as illustrated in FIGS. 2A and 2B, the blown reducing agent such as blown methane gas and the oxygen gas introduced from the gas blowing device 4 are mixed in the tuyere 2. Immediately after this mixed gas is blown into the blast furnace 1 from the tuyere 2, rapid ignition and rapid combustion occur. Then, a raceway 8 that is an area where the oxygen gas reacts with the blown reducing agent such as blown methane gas and coke is formed in the blast furnace beyond the tuyere 2.

When the oxygen concentration in the blast gas increases, the amount of gas in the furnace decreases, and the temperature rise of the burden at the upper part of the blast furnace may be insufficient. In this case, as illustrated in FIG. 1, it is preferable to perform preheated gas blowing, in which part of the blast furnace by-product gas downstream of the first dehydration device 5 is partially combusted by the burner 7 to reach a temperature of about 800° C. to 1000° C., and then blown into the blast furnace shaft section.

And in the method of operating a blast furnace according to one of the disclosed embodiments, it is important to use oxygen gas instead of hot blast (air heated to about 1200° C.) as the blast gas, as described above.

In detail, when hot blast (air heated to about 1200° C.) is used as the blast gas, the combustion gas contains nitrogen of about 50% by volume, which does not contribute to the combustion reaction, and thus the flame temperature in the raceway is hardly to be high. Therefore, when most of the reducing agent blown into the blast furnace is changed to methane gas from pulverized coal, the difference between the reaction heat in the pulverized coal-oxygen reaction and the reaction heat in the methane gas-oxygen reaction described above will cause the tuyere-outlet temperature to drop, and eventually the tuyere-outlet temperature will fall below 2000° C., which is the lower limit of the appropriate temperature. This results in the operational problems such as insufficient heating of the bottom of the blast furnace, pressure drop increase, and tapping failure. Further, since the blast furnace by-product gas contains a large amount of nitrogen, it is necessary to separate the nitrogen from carbon monoxide and carbon dioxide in the process prior to the process of generating methane gas from the blast furnace by-product gas.

On the other hand, the use of oxygen gas as the blast gas can suppress the mixing of nitrogen gas, which does not contribute to the combustion reaction, so that the tuyere-outlet temperature can be raised to a sufficient temperature. This means that the temperature of the flame in the raceway can be higher than when hot blast is used. Therefore, even when a large amount of methane is blown in from the tuyere as a reducing agent, the tuyere-outlet temperature can be controlled in the appropriate range of 2000° C. to 2400° C.

Based on the above, it is important to use oxygen gas as the blast gas in the method of operating a blast furnace according to one of the disclosed embodiments.

Figure 6:
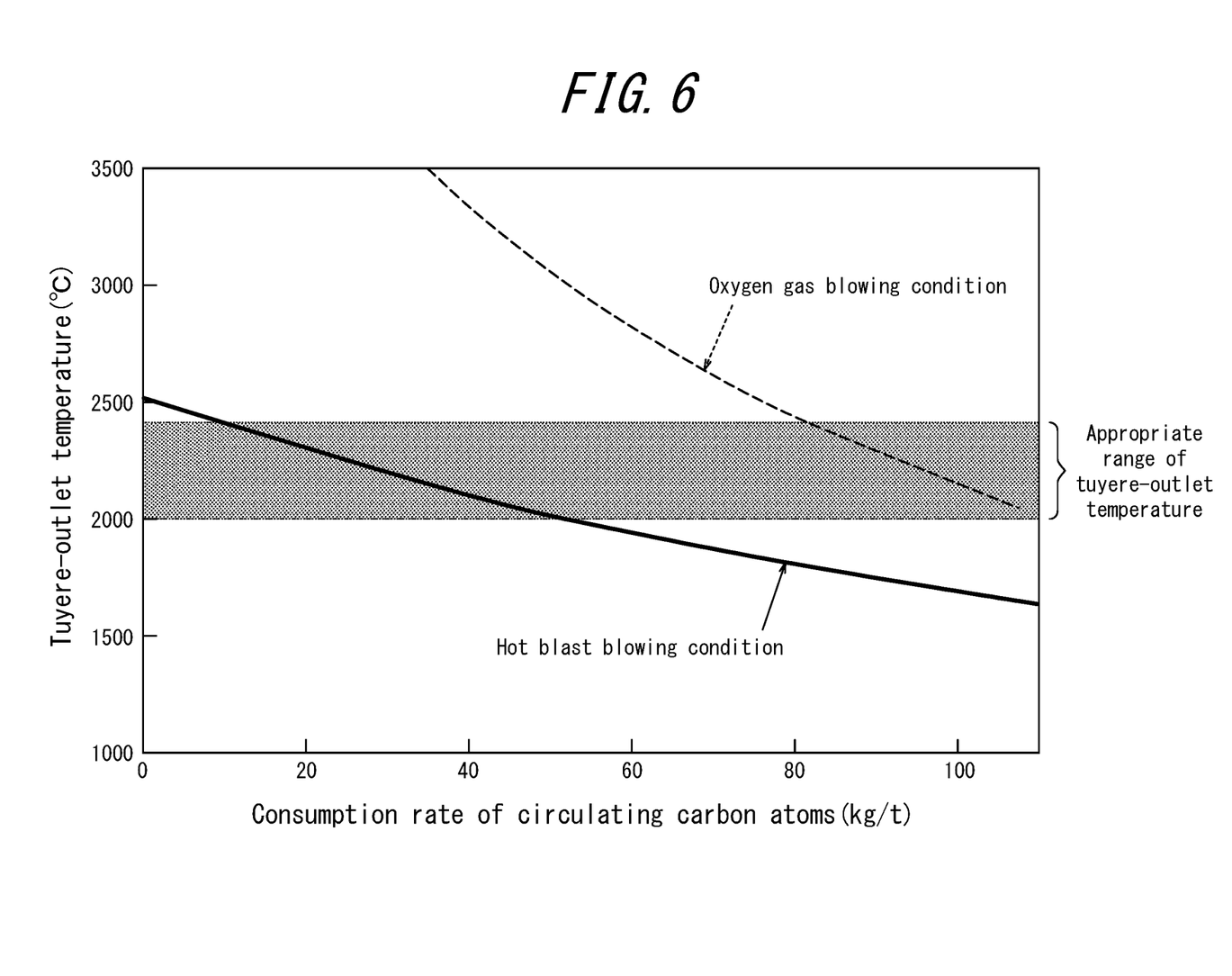
FIG. 6 illustrates an example of the relationship between the consumption rate of circulating carbon atoms and the tuyere-outlet temperature for hot blast and oxygen gas blowing conditions.

FIG. 6 illustrates, for conditions where hot blast (air heated to about 1200° C.) is used as the blast gas (hereinafter referred to as hot blast blowing condition) and where oxygen gas (oxygen concentration: 100%) is used as the blast gas (hereinafter referred to as oxygen gas blowing condition), an example of the relationship between the consumption rate of circulating carbon atoms in the reducing agent (hereinafter referred to simply as the consumption rate of circulating carbon atoms) as described below and the tuyere-outlet temperature. In both conditions, the whole of the blown reducing agent is the regenerative methane gas (methane concentration: 99.5%).

As illustrated in FIG. 6, under the hot blast blowing condition, when the consumption rate of circulating carbon atoms is 52 kg/t or more (i.e., the blowing amount of regenerative methane is 97 Nm$^3$/t or more), the tuyere-outlet temperature falls below 2000° C., which is the lower limit of the appropriate temperature. Thus, under the hot blast blowing condition commonly used, a consumption rate of circulating carbon atoms of 55 kg/t or more, especially 60 kg/t or more causes a decrease in the tuyere-outlet temperature, which makes stable operation impossible.

On the other hand, under the oxygen gas blowing condition, the tuyere-outlet temperature is kept at 2000° C. or higher even when the consumption rate of circulating carbon atoms is 55 kg/t or more, or even 60 kg/t or more.

Under the oxygen gas blowing condition illustrated in FIG. 6, the tuyere-outlet temperature exceeds 2400° C., which is the upper limit of the appropriate temperature, in the range where the consumption rate of circulating carbon atoms is 55 kg/t to 80 kg/t. This is because the whole of the blown reducing agent is the regenerative methane. When the external methane gas is used as part of the blown reducing agent, the tuyere-outlet temperature can be controlled in the range of 2000° C. to 2400° C. even when the consumption rate of circulating carbon atoms is in the range of 55 kg/t to 80 kg/t. Even when the whole of the blown reducing agent is the regenerative methane, the tuyere-outlet temperature can be controlled in the range of 2000° C. to 2400° C. by adjusting the oxygen concentration of the oxygen gas.

The oxygen concentration in the oxygen gas is preferably 80% or more by volume. In detail, when the oxygen concentration in the oxygen gas is low, the amount of gas introduced into the blast furnace, and thus the pressure drop in the blast furnace, may increase, resulting in lower productivity. Further, during the repetition of the gas circulation, the concentration of methane gas in the regenerative methane gas decreases relatively. Therefore, the oxygen concentration in the oxygen gas is preferably 80% or more by volume. The oxygen concentration is more preferably 90% or more by volume, and further preferably 95% or more by volume. In particular, when the oxygen concentration is 90% or more by volume, the methane gas concentration in the regenerative methane gas can be maintained at a high level (about 90% by volume) without the need for external methane gas supply even when the blast furnace is operated beyond the normal operating period, which is very advantageous. The oxygen concentration may be 100% by volume.

The remainder gas other than oxygen in the oxygen gas may include, for example, nitrogen, carbon dioxide, and argon.

The methane concentration of the blown methane gas composed of regenerative methane gas or regenerative methane gas and external methane gas is preferably 80% or more by volume.

In detail, when the methane concentration in the blown methane gas is low, the amount of gas blown into the blast furnace, and thus the pressure drop in the blast furnace may increase, resulting in lower productivity. Further, during the repetition of the gas circulation, the methane concentration in the regenerative methane gas decreases relatively. Therefore, the methane concentration of the blown methane gas is preferably 80% or more by volume percent. The methane concentration of the blown methane gas is more preferably 90% or more by volume, and further preferably 95% or more by volume. The methane concentration of the blown methane gas may be 100% by volume.

For the same reason, the methane concentration of each of the regenerative methane gas and external methane gas is preferably 80% or more by volume. The methane concentration of each of the regenerative methane gas and external methane gas is more preferably 90% or more by volume, and further preferably 95% or more by volume. The methane concentration of each of the regenerative methane gas and external methane gas may be 100% by volume.

The remainder gas other than methane in the blown methane gas, regenerative methane gas, and external methane gas may include, for example, carbon monoxide, carbon dioxide, hydrogen and hydrocarbons, and an impurity gas such as nitrogen.

When the methane concentration in the regenerative methane gas decreases, the methane concentration in the blown methane gas can be kept high, by for example, decreasing the ratio of the regenerative methane gas in the blown methane gas while increasing the ratio of the external methane gas with high methane concentration.

In the method of operating a blast furnace according to one of the disclosed embodiments, the consumption rate of circulating carbon atoms in the reducing agent is preferably 55 kg/t or more and more preferably 60 kg/t or more.

The consumption rate of circulating carbon atoms is a carbon equivalent mass of the regenerative methane gas that is blown into the blast furnace as the reducing agent for producing 1 t of hot metal, and is obtained by the following equation:

[Consumption rate of circulating carbon atoms (kg/t)]=[Mass of methane in regenerative methane gas blown into blast furnace as reducing agent (kg)]×(12/16)÷[Production amount of hot metal (t)].

For stable operation of the blast furnace, it is generally necessary to control the tuyere-outlet temperature in the range of 2000° C. to 2400° C. Therefore, when hot blast (air heated to about 1200° C.) is used as the blast gas, methane gas can be blown into the blast furnace only up to about 52 kg/t of carbon equivalent mass in order to keep the tuyere-outlet temperature in the aforementioned range. In detail, even when the whole of the methane gas blown into the blast furnace is the regenerative methane gas, the consumption rate of circulating carbon atoms in the reducing agent is only about 52 kg/t.

On the other hand, in the method of operating a blast furnace according to one of the disclosed embodiments, even with a significant increase in blowing amount of the methane gas, the tuyere-outlet temperature can be controlled in the range of 2000° C. to 2400° C. Therefore, the consumption rate of circulating carbon atoms in the reducing agent can be increased to 55 kg/t or more, and even 60 kg/t or more. This will increase the use of the regenerative methane gas derived from carbon monoxide and carbon dioxide contained in the blast furnace by-product gas, further reducing carbon dioxide emissions from the blast furnace. The consumption rate of circulating carbon atoms in the reducing agent is preferably 80 kg/t or more, and more preferably 90 kg/t or more. No upper limit is placed on the consumption rate of circulating carbon atoms in the reducing agent, but the upper limit is preferably 110 kg/t or less.

The consumption rate of circulating carbon atoms in the reducing agent can be controlled by adjusting the amount of the regenerative methane gas in the blown reducing agent blown into the tuyere.

In particular, by setting the ratio of the regenerative methane gas in the blown methane gas to 80% or more by volume, preferably 90% or more by volume, a high carbon dioxide emission reduction effect can be achieved.

The regenerative methane gas may be generated from part of the blast furnace by-product gas and a surplus of the blast furnace by-product gas may be supplied to the steelworks. Furthermore, if there is a surplus of the regenerative methane gas, the surplus may be supplied to the steelworks.

The blowing amount of oxygen gas and reducing agent, as well as other operating conditions, are not limited and can be appropriately determined according to the capacity of the blast furnace and the like.

[Blast Furnace Ancillary Facility]

The blast furnace ancillary facility according to one of the disclosed embodiments is a blast furnace ancillary facility used in the method of operating a blast furnace as described above, comprising a methane gas generation device that generates the regenerative methane gas using the blast furnace by-product gas, a preheating device that preheats the oxygen gas and/or the regenerative methane gas, and a gas blowing device having a methane gas supply section that introduces the regenerative methane gas into the tuyere of the blast furnace and an oxygen gas supply section that introduces the oxygen gas into the tuyere of the blast furnace.

Here, the methane gas generation device has, for example, a blast furnace by-product gas intake section, a hydrogen gas intake section, and a reaction section. In the reaction section, the blast furnace by-product gas taken in from the blast furnace by-product gas intake section and the hydrogen gas taken in from the hydrogen gas intake section are reacted to produce the regenerative methane gas.

Since the reaction to produce the methane gas generates heat, the reaction section is preferably equipped with a cooling mechanism. It is also more preferable to have a waste heat recovery mechanism, such as one of a shell-and-tube or plate-fin type, so that the heat generated in the methane gas production reaction can be used in other equipment, such as the preheating device described below.

Preheating in the preheating device is performed by an electric heating device (electric heater) or heat exchanger. One example of the preheating device has an electric heater and a distribution passage for the material to be heated (such as the regenerated methane gas or oxygen gas). The electric heater is installed in the distribution passage of the material to be heated. Another example of the preheating device has a heat transfer unit (heat exchanger) that exchanges heat between the material to be heated and the heat medium, a distribution passage for the material to be heated, and a distribution passage for the heat medium.

As described above, for example, as illustrated in FIG. 2A, the gas blowing device comprises coaxial multiple pipes including the central pipe 4-1 and outer pipe 4-3. Then, the methane gas (regenerative methane gas and appropriately, external methane gas as described below) is introduced into the inner passage of the central pipe, which serves as the methane gas supply section (passage), and the oxygen gas is introduced into the annular pipe passage between the central pipe 4-1 and the outer pipe 4-3, which serves as the oxygen gas supply section (passage).

Another blown reducing agent, for example, pulverized coal, waste plastics, or reducing gas such as hydrogen gas or carbon monoxide gas, may be used together.

When the another blown reducing agent is used, it may also be introduced into the methane gas supply section. When using pulverized coal or waste plastics as the another blown reducing agent, it is preferable to provide, separately from the methane gas supply section, another reducing agent supply section (passage) through which the pulverized coal or waste plastics flow. In this case, as illustrated in FIG. 2B, for example, the gas blowing device comprises coaxial multiple pipes including, in addition to the central pipe 4-1 and outer pipe 4-3, the inner pipe 4-2 provided between the central pipe 4-1 and outer pipe 4-3. Then, the another blown reducing agent such as pulverized coal or waste plastics is introduced from the inner passage of the central pipe, which serves as the another reducing agent supply section. Further, the methane gas is introduced from the annular pipe passage between the central pipe 4-1 and the outer pipe 4-3, which is the methane gas supply section, and oxygen is introduced from the annular pipe passage between the inner pipe 4-2 and the outer pipe 4-3, which is the oxygen gas supply section.

EXAMPLES

Using the blast furnaces and blast furnace ancillary facilities schematically illustrated in FIGS. 1 and 3 to 5, blast furnace operation was conducted under the conditions listed in Table 1, and the tuyere-outlet temperature and carbon dioxide emissions from the blast furnace during operation were evaluated. The evaluation results are also listed in Table 1.

Figure 3:
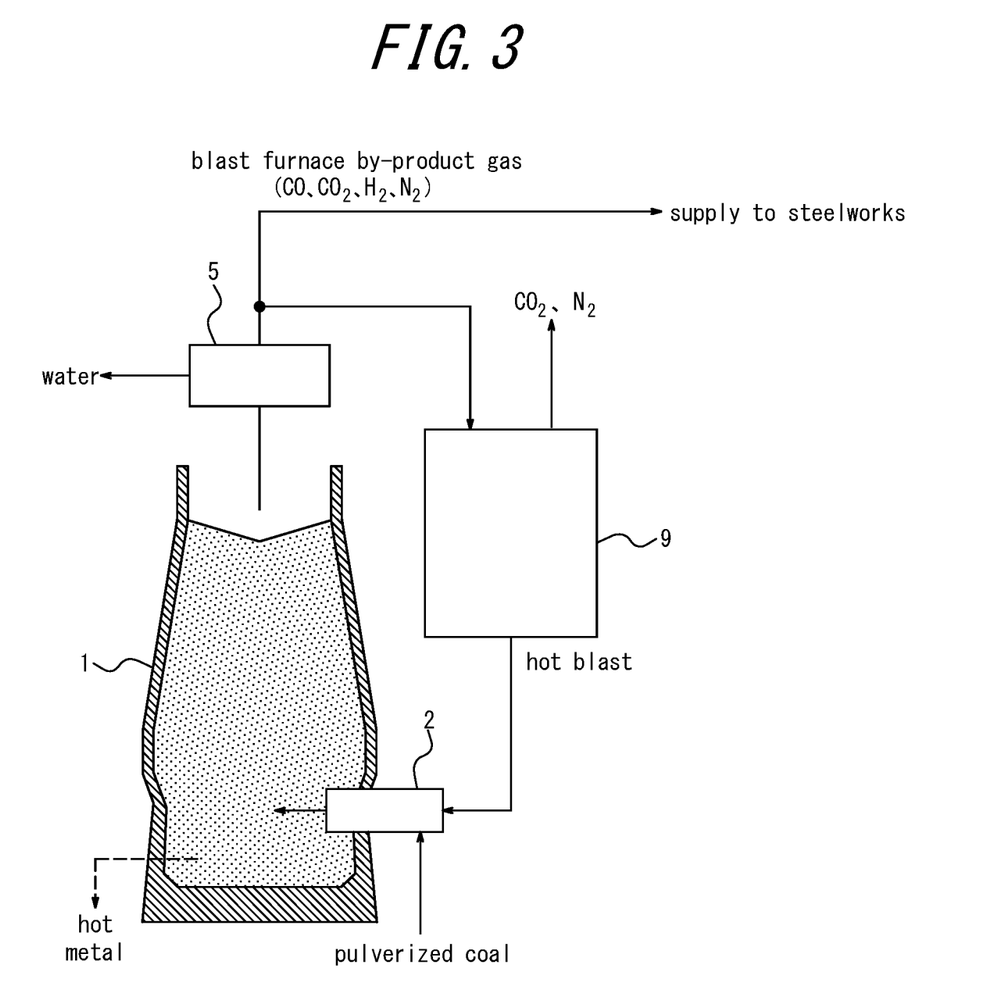
FIG. 3 schematically illustrates a blast furnace and blast furnace ancillary facility used in a comparative example.
Figure 4:
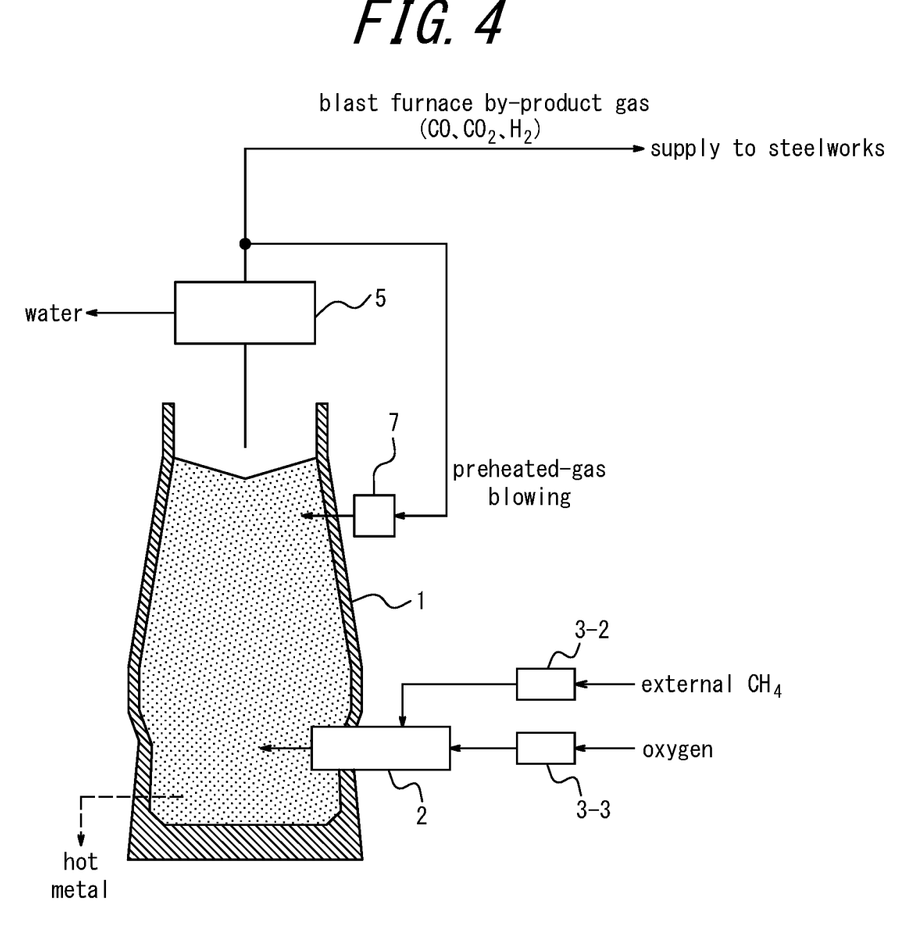
FIG. 4 schematically illustrates a blast furnace and blast furnace ancillary facility used in a comparative example.
Figure 5:
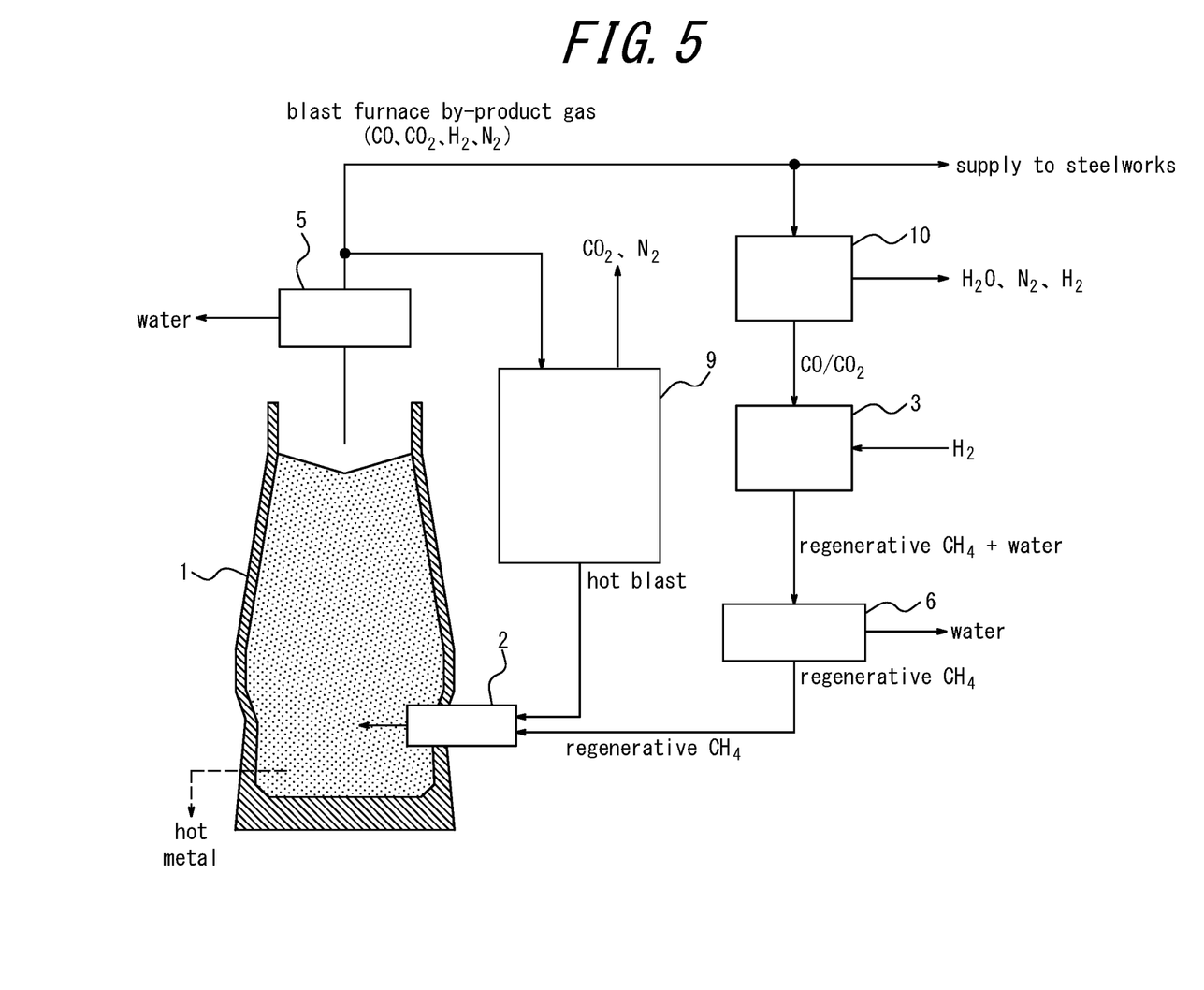
FIG. 5 schematically illustrates a blast furnace and blast furnace ancillary facility used in a comparative example.

In FIGS. 3 to 5, reference sign 9 is a hot air oven and 10 is a gas separation device.

Figure 1:
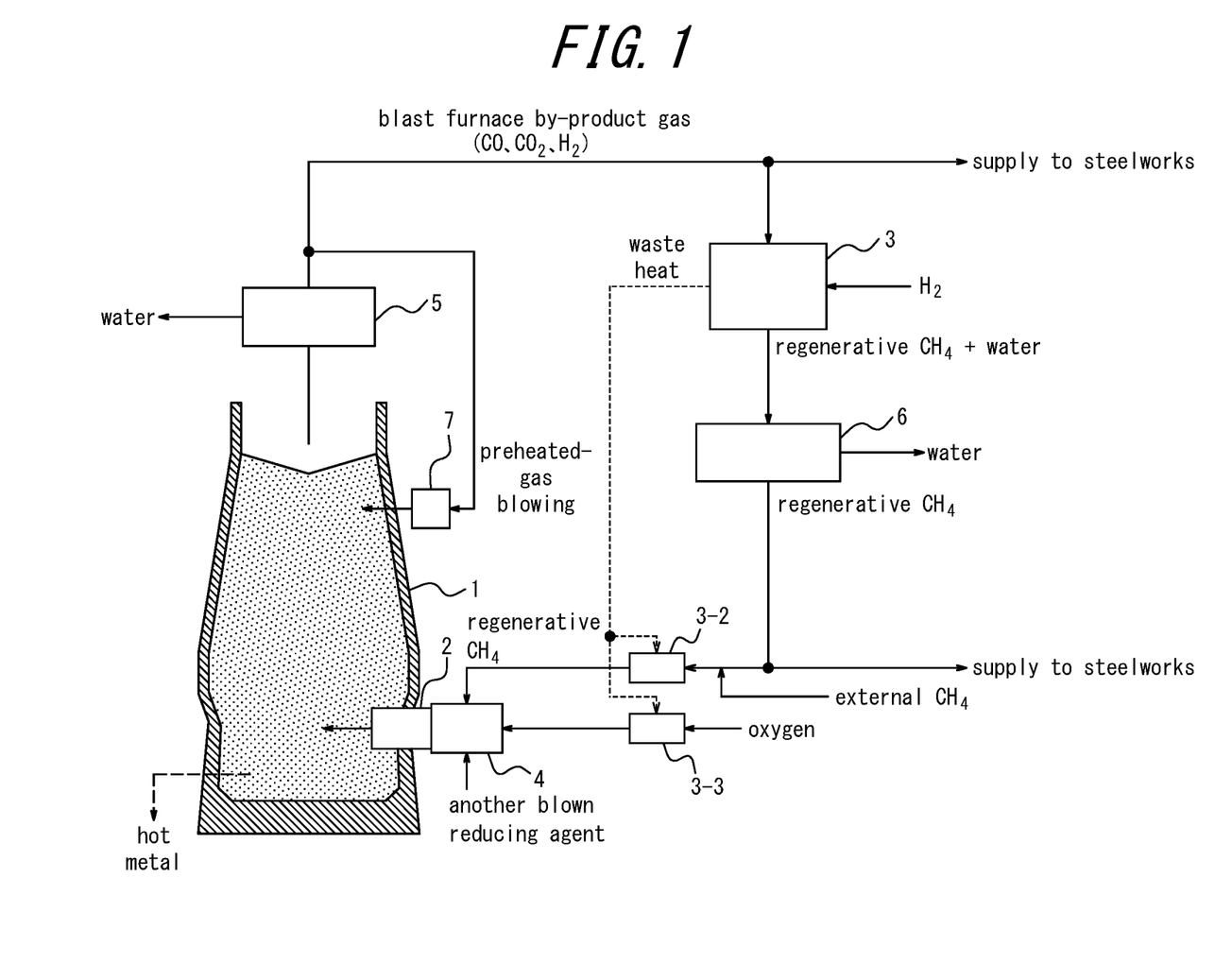
FIG. 1 schematically illustrates an example of a blast furnace and blast furnace ancillary facility used in the method of operating a blast furnace according to one of the disclosed embodiments.

In Example 1, the blast furnace and blast furnace ancillary facility schematically illustrated in FIG. 1 were used to generate regenerative methane gas from part of a blast furnace by-product gas, and a surplus of the blast furnace by-product gas was supplied to a steelworks. The whole of the blown reducing agent was the regenerative methane gas, and the amount of the regenerative methane gas generated was adjusted so that no surplus of the regenerative methane gas was generated. In addition, the blast gas (oxygen gas) was preheated.

In Example 2, the blast furnace and blast furnace ancillary facility schematically illustrated in FIG. 1 were used to generate regenerative methane gas from part of a blast furnace by-product gas, and a surplus of the blast furnace by-product gas was supplied to a steelworks. The whole of the blown reducing agent was the regenerative methane gas, and the amount of the regenerative methane gas generated was adjusted so that no surplus of the regenerative methane gas was generated. In addition, the blown reducing agent (regenerative methane gas) was preheated.

In Example 3, the blast furnace and blast furnace ancillary facility schematically illustrated in FIG. 1 were used to generate a regenerative methane gas from part of a blast furnace by-product gas, and a surplus of the blast furnace by-product gas was supplied to a steelworks. The whole of the blown reducing agent was the regenerative methane gas, and the amount of the regenerative methane gas generated was adjusted so that no surplus of the regenerative methane gas was generated. In addition, the blast gas (oxygen gas) and blown reducing agent (regenerative methane gas) were preheated.

In Example 4, the blast furnace and blast furnace ancillary facility schematically illustrated in FIG. 1 were used to generate a regenerative methane gas from part of a blast furnace by-product gas, and a surplus of the blast furnace by-product gas was supplied to a steelworks. As the blown reducing agent, in addition to the regenerative methane gas, an external methane gas derived from fossil fuels was also used. In addition, the blast gas (oxygen gas) was preheated.

In Example 5, the blast furnace and blast furnace ancillary facility schematically illustrated in FIG. 1 were used to generate a regenerative methane gas from part of a blast furnace by-product gas, and a surplus of the blast furnace by-product gas was supplied to a steelworks. As the blown reducing agent, in addition to the regenerative methane gas, an external methane gas derived from fossil fuels was also used. In addition, the blown reducing agent (regenerative methane gas+external methane gas) was preheated.

In Example 6, the blast furnace and blast furnace ancillary facility schematically illustrated in FIG. 1 were used to generate a regenerative methane gas from part of a blast furnace by-product gas, and a surplus of the blast furnace by-product gas was supplied to a steelworks. As the blown reducing agent, in addition to the regenerative methane gas, an external methane gas derived from fossil fuels was also used. In addition, the blast gas (oxygen gas) and blown reducing agent (regenerative methane gas+external methane gas) were preheated.

On the other hand, in Comparative Example 1, the blast furnace and blast furnace ancillary facility schematically illustrated in FIG. 3 were used. In detail, Comparative Example 1 is a general method of operating a blast furnace that uses hot blast (air heated to about 1200° C. (oxygen concentration: about 21% to 25% by volume)) as the blast gas and pulverized coal as the blown reducing agent. A regenerative methane gas was not produced from a blast furnace by-product gas.

In Comparative Example 2, the blast furnace and blast furnace ancillary facility schematically illustrated in FIG. 4 were used. In detail, an external methane gas was used as the whole of the blown reducing agent, and oxygen gas was used as blast gas. In addition, the blast gas (oxygen gas) and blown reducing agent (external methane gas) were preheated.

In Comparative Example 3, the blast furnace and blast furnace ancillary facility schematically illustrated in FIG. 5 were used. In detail, hot blast (air heated to about 1200° C. (oxygen concentration: about 21% to 25% by volume)) was used as the blast gas and a regenerative methane gas was used as the blown reducing agent. Before generating the regenerative methane gas, carbon monoxide and carbon dioxide were separated from a blast furnace by-product gas, and the regenerative methane gas was generated from the separated carbon monoxide and carbon dioxide. The amount of raw material gas in the methane gas generation process in Comparative Example 3 in Table 1 is the amount of blast furnace by-product gas before carbon monoxide and carbon dioxide are separated from the blast furnace by-product gas.

For the purpose of comparison, the specifications of the blast furnaces were standardized as much as possible. In detail, the shaft efficiency was 94% and the heat loss was 150000 kcal/t.

The unit "kcal/t" refers to the amount of heat loss (kcal) generated in producing 1 t of hot metal. Similarly, the unit "kg/t" used for coke rate, for example, means the amount of coke (kg) used to produce 1 t of hot metal, etc. Further, the unit "Nm$^3$/t" used for the blown methane ratio refers to the amount of methane (Nm$^3$) in the blown methane gas that is blown into the blast furnace to produce 1 t of hot metal (the blown methane ratio is the sum of the regenerative methane ratio and the external methane ratio, but the regenerative methane gas contains a small amount of remainder gas other than methane. The values of the regenerative methane ratio and external methane ratio listed in Table 1 are both methane amounts excluding the small amount of remainder gas other than methane and are obtained by rounding off one decimal place. Therefore, each of the blown methane ratios listed in Table 1 is sometimes different from the sum of the corresponding regenerative methane ratio and external methane ratio. The same may apply to another value in Table 1).

In addition, the item name of "Blast furnace Input C" in Table 1 refers to the mass (kg) of carbon atoms of external origin (specifically contained in coke, pulverized coal, and the external methane gas) used to produce 1 t of hot metal.

TABLE 1

|  |  |  | Example 1 | Example 2 | Example 3 | Example 4 | Example 5 |
|---|---|---|---|---|---|---|---|
| Blast | Shaft efficiency | — | 0.94 | 0.94 | 0.94 | 0.94 | 0.94 |
| furnace | Heat loss | kcal/t | 150000 | 150000 | 150000 | 150000 | 150000 |
| specification | Coke rate | kg/t | 326 | 328 | 296 | 326 | 328 |

TABLE 1-continued

| | | | | | | | |
|---|---|---|---|---|---|---|---|
| | Reducing agent (Blown reducing agent) | Pulverized coal ratio | kg/t | 0 | 0 | 0 | 0 | 0 |
| | | Blown methane ratio | Nm³/t | 238 | 238 | 252 | 238 | 238 |
| | | Regenerative methane ratio | Nm³/t | 238 | 238 | 252 | 118 | 118 |
| | | External methane ratio | Nm³/t | 0 | 0 | 0 | 120 | 120 |
| | | Preheating temperature (supply temperature) | °C. | 80 | 400 | 400 | 80 | 400 |
| | Blast gas | Supply amount | Nm³/t | 330 | 332 | 313 | 330 | 332 |
| | | Preheating temperature (supply temperature) | °C. | 600 | 25 | 600 | 600 | 25 |
| | | Type | — | oxygen gas | oxygen gas | oxygen gas | oxygen gas | oxygen gas |
| | | Oxygen concentration | % by volume | 100 | 100 | 100 | 100 | 100 |
| | | Generation amount of blast furnace by-product gas | Nm³/t | 942 | 944 | 923 | 942 | 944 |
| Methane gas generation process | | Raw material gas type | — | blast furnace by-product gas | blast furnace by-product gas | blast furnace by-product gas | blast furnace by-product gas | blast furnace by-product gas |
| | | Raw material gas amount | Nm³/t | 334 | 332 | 365 | 166 | 165 |
| | | Hydrogen gas supply amount | Nm³/t | 741 | 738 | 770 | 367 | 366 |
| | | Generation amount of regenerative methane gas | Nm³/t | 238 | 238 | 252 | 118 | 118 |
| | | Methane concentration of regenerative methane gas | % by volume | 99.6 | 99.6 | 99.6 | 99.6 | 99.6 |
| Pre-heating process | | Regenerative methane gas (including another blown reducing agent) | — | absent | present | present | absent | present |
| | | Oxygen gas | — | present | absent | present | present | absent |
| C balance | | Consumption rate of circulating carbon atoms | kg/t | 128 | 128 | 135 | 63 | 63 |
| | | Blast furnace Input C | kg/t | 280 | 282 | 254 | 344 | 346 |
| Evaluation results | | Amount of CO₂ emitted from blast furnace to outside | kg/t | 1027 | 1034 | 931 | 1262 | 1270 |
| | | Tuyere-outlet temperature | °C. | 2005 | 2006 | 2008 | 2005 | 2006 |

| | | | | Example 6 | Comparative Example 1 | Comparative Example 2 | Comparative Example 3 |
|---|---|---|---|---|---|---|---|
| Blast furnace specification | | Shaft efficiency | — | 0.94 | 0.94 | 0.94 | 0.94 |
| | | Heat loss | kcal/t | 150000 | 150000 | 150000 | 150000 |
| | | Coke rate | kg/t | 296 | 331 | 296 | 407 |
| | Reducing agent (Blown reducing agent) | Pulverized coal ratio | kg/t | 0 | 170 | 0 | 0 |
| | | Blown methane ratio | Nm³/t | 252 | 0 | 252 | 103 |
| | | Regenerative methane ratio | Nm³/t | 102 | 0 | 0 | 103 |
| | | External methane ratio | Nm³/t | 150 | 0 | 252 | 0 |
| | | Preheating temperature (supply temperature) | °C. | 400 | 25 | 400 | 80 |
| | Blast gas | Supply amount | Nm³/t | 313 | 1006 | 313 | 1170 |
| | | Preheating temperature (supply temperature) | °C. | 600 | 1200 | 600 | 1200 |
| | | Type | — | oxygen gas | hot blast | oxygen gas | hot blast |
| | | Oxygen concentration | % by volume | 100 | 25 | 100 | 25 |
| | | Generation amount of blast furnace by-product gas | Nm³/t | 923 | 1517 | 923 | 1599 |
| Methane gas generation process | | Raw material gas type | — | blast furnace by-product gas | — | — | blast furnace by-product gas |
| | | Raw material gas amount | Nm³/t | 148 | — | — | 247 |
| | | Hydrogen gas supply amount | Nm³/t | 312 | — | — | 340 |
| | | Generation amount of regenerative methane gas | Nm³/t | 102 | — | — | 103 |
| | | Methane concentration of regenerative methane gas | % by volume | 99.6 | — | — | 99.6 |
| Pre-heating process | | Regenerative methane gas (including another blown reducing agent) | — | present | absent | present | absent |
| | | Oxygen gas | — | present | absent | present | absent |
| C balance | | Consumption rate of circulating carbon atoms | kg/t | 55 | 0 | 0 | 55 |
| | | Blast furnace Input C | kg/t | 334 | 420 | 389 | 350 |
| Evaluation results | | Amount of CO₂ emitted from blast furnace to outside | kg/t | 1226 | 1539 | 1426 | 1283 |
| | | Tuyere-outlet temperature | °C. | 2008 | 2179 | 2008 | 1980 |

As indicated in Table 1, in all of the examples, the amount of carbon dioxide emitted from the blast furnace to the outside could be reduced while maintaining stable blast furnace operation by controlling the tuyere-outlet temperature in the range of 2000° C. to 2400° C.

On the other hand, Comparative Examples 1 and 2 did not provide sufficient carbon dioxide emission reduction effect. In Comparative Example 3, the blast furnace could not be stably operated because the tuyere-outlet temperature was lower than 2000° C. due to the increase in the amount of blown methane gas.

REFERENCE SIGNS LIST

1: blast furnace
2: tuyere
3: methane gas generation device
3-2, 3-3: preheating device
4: gas blowing device
4-1: central pipe
4-2: inner pipe
4-3: outer pipe
5: first dehydration device
6: second dehydration device
7: burner
8: raceway
9: hot air oven
10: gas separation device

The invention claimed is:

1. A method of operating a blast furnace, comprising
generating a regenerative methane gas using a blast furnace by-product gas which is a by-product gas discharged from the blast furnace, and
blowing a blast gas and a reducing agent into the blast furnace from a tuyere,
wherein the blast gas is oxygen gas, the regenerative methane gas is used as at least part of the reducing agent, and the oxygen gas and/or the regenerative methane gas is preheated before being blown into the blast furnace from the tuyere,
a consumption rate of circulating carbon atoms in the reducing agent is 55 kg/t or more, and
the consumption rate of circulating carbon atoms is a carbon equivalent mass of the regenerative methane gas that is blown into the blast furnace as the reducing agent for producing 1 t of hot metal, and is obtained by the following equation:

[Consumption rate of circulating carbon atoms (kg/t)]=[Mass of methane in regenerative methane gas blown into blast furnace as reducing agent (kg)]×(12/16): [Production amount of hot metal (t)].

2. The method of operating a blast furnace according to claim 1, wherein the consumption rate of circulating carbon atoms in the reducing agent is 60 kg/t or more.

3. The method of operating a blast furnace according to claim 1, wherein the oxygen gas has an oxygen concentration of 80% or more by volume.

4. The method of operating a blast furnace according to claim 1, wherein the regenerative methane gas is generated from part of the blast furnace by-product gas and a surplus of the blast furnace by-product gas is supplied to a steelworks.

5. The method of operating a blast furnace according to claim 1, wherein a surplus of the regenerative methane gas is supplied to the steelworks.

6. A blast furnace ancillary facility used in the method of operating a blast furnace according to claim 1, comprising
a methane gas generation device that generates the regenerative methane gas using the blast furnace by-product gas,
a preheating device that preheats the oxygen gas and/or the regenerative methane gas, and
a gas blowing device having a methane gas supply section that introduces the regenerative methane gas into the tuyere of the blast furnace and an oxygen gas supply section that introduces the oxygen gas into the tuyere of the blast furnace.

7. The method of operating a blast furnace according to claim 2, wherein the oxygen gas has an oxygen concentration of 80% or more by volume.

8. The method of operating a blast furnace according to claim 2, wherein the regenerative methane gas is generated from part of the blast furnace by-product gas and a surplus of the blast furnace by-product gas is supplied to a steelworks.

9. The method of operating a blast furnace according to claim 2, wherein a surplus of the regenerative methane gas is supplied to the steelworks.

10. A blast furnace ancillary facility used in the method of operating a blast furnace according to claim 2, comprising
a methane gas generation device that generates the regenerative methane gas using the blast furnace by-product gas,
a preheating device that preheats the oxygen gas and/or the regenerative methane gas, and
a gas blowing device having a methane gas supply section that introduces the regenerative methane gas into the tuyere of the blast furnace and an oxygen gas supply section that introduces the oxygen gas into the tuyere of the blast furnace.

* * * * *